United States Patent [19]

Glorioso et al.

[11] Patent Number: 5,424,014
[45] Date of Patent: Jun. 13, 1995

[54] METHOD FOR EXTRUDING FOAMABLE POLYMER MATERIAL

[75] Inventors: Sammie J. Glorioso, Brandon; James H. Burgess, Meridian, both of Miss.

[73] Assignee: Apache Products Company, Jackson, Miss.

[21] Appl. No.: 144,621

[22] Filed: Nov. 1, 1993

Related U.S. Application Data

[63] Continuation of Ser. No. 946,738, Sep. 18, 1992, abandoned.

[51] Int. Cl.[6] .................. B29C 44/20; B29C 44/50
[52] U.S. Cl. .................. 264/45.3; 264/45.9; 264/51; 264/53
[58] Field of Search ............ 264/45.3, 51, 53, 328.6, 264/45.9, 816.84

[56] References Cited

U.S. PATENT DOCUMENTS

| | | |
|---|---|---|
| 3,466,705 | 9/1969 | Richie . |
| 4,341,876 | 7/1982 | Kreuer et al. ............ 264/45.3 |
| 4,342,847 | 8/1982 | Goyert et al. ............ 264/211 |
| 4,395,214 | 7/1983 | Phipps et al. ............ 264/51 |
| 4,496,625 | 1/1985 | Snider et al. ............ 264/45.3 |
| 4,500,671 | 2/1985 | Goyert et al. ............ 525/66 |
| 4,597,927 | 7/1986 | Zeitler et al. ............ 264/DIG. 69 |
| 4,607,061 | 8/1986 | Schmidt ............ 264/45.3 |
| 4,948,859 | 8/1990 | Echols et al. ............ 264/211.23 |
| 5,149,722 | 9/1992 | Soukup ............ 521/99 |

Primary Examiner—Allan R. Kuhns
Attorney, Agent, or Firm—Keck, Mahin & Cate

[57] ABSTRACT

A method for preparing a thermosetting foam, such as polyisocyanurate or polyurethane foam, includes introducing polyol and isocyanate to a screw of an extruder and mixing in the extruder screw. Catalyst is then added and mixed with the already formed mixture in the extruder screw. This mixture is extruded onto a conveyor and foamed on the conveyor. Finely divided carbon black, dispersing agent and/or surfactant may be mixed with polyol before introducing to the screw of the extruder or carbon black may be dispersed in polyol in the extruder and a polyol premix made before the remainder of the polyol is added. Foam cell size is decreased when extruder speed is increased. The foaming agent, which is preferably HCFC or water, may be mixed with one of the components, preferably the polyol, before introducing to the screw of the extruder. The mixture is cooled before extruding onto a conveyor to delay the foaming step until the mixture is outside the extruder. A carbon black dispersion may also be made, for future use. The process described may be used for making foam boards or bunstock.

20 Claims, 3 Drawing Sheets

METHOD FOR EXTRUDING FOAMABLE POLYMER MATERIAL

This is a continuation of application Ser. No. 07/946,738, filed Sep. 18, 1992, now abandoned.

FIELD OF THE INVENTION

The invention relates to methods for producing polymer foams, and particularly to a method for extruding polymer foam material, such as polyisocyanurate and polyurethane foams, using a screw-type extruder.

BACKGROUND OF THE INVENTION

Polymer foams, such as polyisocyanurate and polyurethane foams have not previously been able to be produced using an extruder, as the foaming material "firms" in the extruder and blocks the equipment.

Richie, U.S. Pat. No. 3,466,705, describes apparatus for extruding foamable thermoplastic material, such as polystyrene, preferably in tubular form. Richie discloses that the apparatus can be used for thermosetting materials, such as polyurethanes, but that steam or hot water would have a damaging effect and therefore are not used. A foam-augmenting gas such as freon is used as the foaming agent. Richie uses an expansion space of transverse cross-sectional area which increases in size gradually in the direction of travel of the extruded product.

The disadvantages of the prior art are overcome by the invention, as described below.

SUMMARY OF THE INVENTION

A method of preparing polyisocyanurate foam using a screw-type extruder for mixing the components of the composition includes introducing isocyanate and polyol, to a screw of an extruder, and subsequently mixing the isocyanate and polyol, together with foaming agent and, optionally, carbon black and surfactant in the extruder. Catalyst is added and mixed with the already formed polyol/isocyanate mixture in the extruder screw. This mixture is almost immediately extruded onto a conveyor and foamed on the conveyor.

Finely divided carbon black and/or dispersing agent and/or surfactant may be mixed with the isocyanate or with the polyol before introducing to the screw of the extruder. This premix (isocyanate or polyol and/or foaming agent and/or dispersant and/or carbon black) may also be made in the extruder.

The foaming agent, which is preferably a hydrochlorofluorocarbon (HCFC) or water, is mixed with one of the components, preferably the polyol, before introducing to the screw of the extruder. If water is the foaming agent, the water is vaporized for foaming the mixture and reacts with the isocyanate to form carbon dioxide, which further foams the mixture. Other foaming agents may alternatively be used.

The mixture is cooled in the extruder to substantially delay the foaming step until the mixture is outside the extruder.

Foam cell size is generally decreased when extruder speed is increased.

A carbon black dispersion may be made in the extruder using carbon black, dispersant, optional surfactant and isocyanate or polyol. This dispersion may be used immediately or stored for future use. Use of an extruder provides a better quality dispersion, measuring 8 or more on the Hegman scale, than a dispersion made in a Kady mill.

It is an object of the invention to provide a method for extruding polymer foams.

It is another object of the invention to provide a method for extruding thermosetting foams, such as polyisocyanurate and polyurethane foams, using a screw-type extruder, such as a twin-screw extruder.

It is yet another object of the invention to provide a method for making a carbon black dispersion in an extruder.

It is a further object of the invention to combine preparation of a carbon-black dispersion and production of a foam using the carbon-black dispersion, in a single operation.

DETAILED DESCRIPTION OF THE INVENTION

Figure 1:
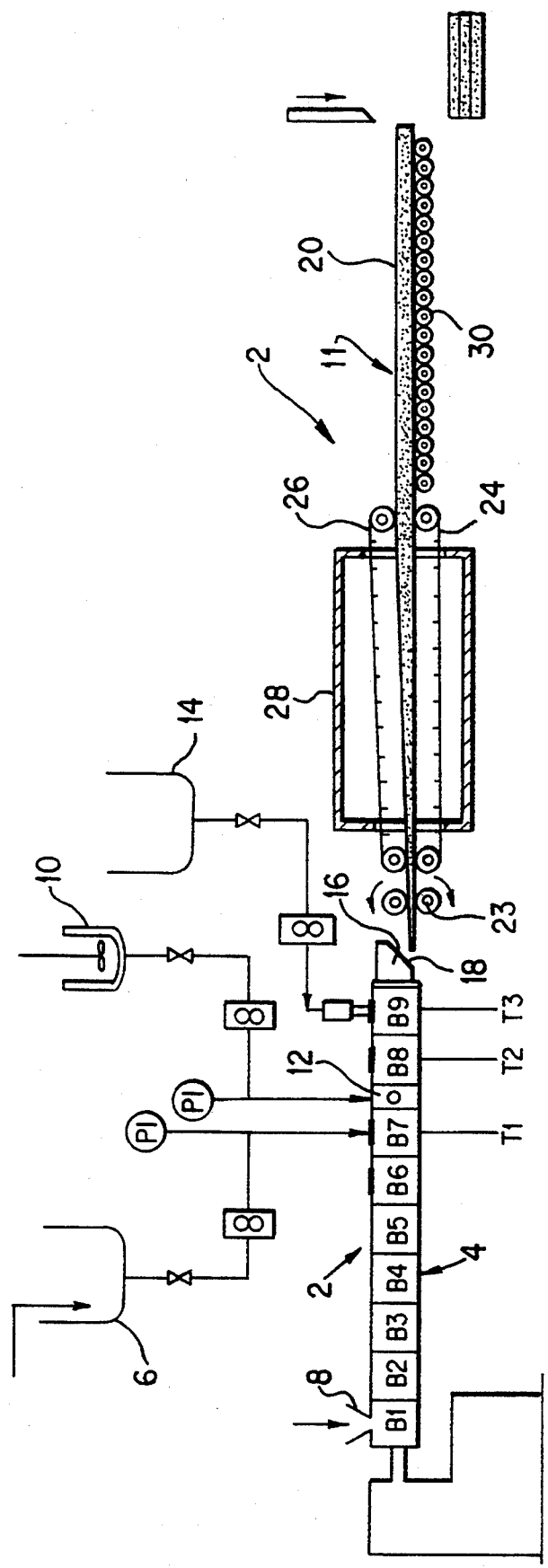
FIG. 1 is a schematic illustration of apparatus for extruding polymer foam onto a conveyor, according to the invention.

It has unexpectedly been found that thermosetting foams, such as polyisocyanurate or polyurethane foams, may be made using an extruder for mixing the foamable mixture before extruding onto a belt conveyor. This allows use of a continuous process in which thermosetting foams may be made at much faster speeds than previously possible, without any decrease in quality.

Foaming operations alone may be carried out in an extruder or dispersion and foaming operations may successfully be combined in the extruder. A twin-screw extruder is preferably used. The extruder is able to process materials for making a thermosetting polymer, such as an isocyanurate polymer, in a controlled manner with independent catalyst addition and variable reactivity. Higher levels of carbon black filler can be handled than on conventional foam mixing equipment. High quality carbon black dispersions in isocyanate or polyol media are obtained, and these dispersions may have higher levels of carbon black than can be dispersed using a conventional Kady (kinetic dispersion) mill.

The foams may be blown with blowing agents such as hydrochlorofluorocarbons and/or water ($CO_2$). Typical examples of hydrochlorofluorocarbon blowing agents are HCFC 141b and HCFC 22. Further, high viscosity isocyanates and polymer premix, which cannot be processed using a conventional Kady mill and conventional foam mixing equipment, may be used in the process described.

The extruder is cooled downstream of the dispersion section of the extruder to prevent premature reaction of the foam ingredients. Low torque requirements allow scale-up to an extruder capable of processing up to about 150 lb./min. of foam ingredients. Flocculation of carbon black-polyol dispersions can be avoided by maintaining a high shear rate on the dispersion, through the foaming section, producing a foam with excellent carbon black dispersion and significant K-factor reduction.

In general, the quality of the dispersion increases with increased carbon black loading and with viscosity of the starting medium. Addition of the polyol or isocyanate in the dispersion section may be accomplished in several staged injections. This is preferred for keeping the viscosity and shear high enough to ensure a high quality dispersion. Foam appearance in the tests was very good up to about 450 lb./hr. total throughput. At rates above 600 lb./hr. the foam cells may be coarser than at lower rates.

The preferred dispersions were obtained when the charge of carbon black was added with the first injection of the dispersion medium to form a mixture having 35 to 50% carbon black. The final carbon black percentage was then obtained by subsequent liquid injections in the dispersion section of the extruder. Maximum temperatures of about 50° C. in the dispersion section do not present an operational problem. The dispersion may be actively cooled by cold water circulating in the barrel jackets and passively cooled by injection of the remaining foam ingredients into the dispersion.

A preferred extruder screw speed to provide a good foam mix is about 600 rpm. For extended use at high speed, a special hardening treatment is advantageously used on the screw element in the dispersion section due to the abrasiveness of the carbon black.

A method of extruding polyisocyanurate foam includes adding a blend of isocyanate and carbon black at a first position of the extruder, adding polyol blend to mix with the isocyanate blend at a second position of the extruder closer to the extrusion position than the first position, adding catalyst blend to the mixed polyol and isocyanate blend at a third position of the extruder closer to the extrusion position than the first and second positions, and extruding the catalyzed mixture onto a belt conveyor for foaming.

A process of the invention will be described with reference to FIG. 1 which illustrates apparatus suitable for practicing the invention. A single or twin screw extruder may be used. A twin screw extruder provides better mixing and is preferred. The barrels of the extruder are preferably separated by sheets of Graphoil paper, which aids in taking down the apparatus.

Apparatus 2 includes extruder 4 which, in the non-limiting example shown in FIG. 1, has nine barrels, numbered B1 through B9, as shown. Isocyanate solution is mixed and provided to reservoir 6 having a large capacity, for example a reservoir of 30 gallon capacity. If carbon black is used for increasing the thermal insulation properties of the resultant foam, as described in Gluck, U.S. Pat. No. 4,795,763, the entire disclosure of which is incorporated herein by reference, a suspension of carbon black in the isocyanate may be fed to reservoir 6. Solution from reservoir 6 is fed, in a non-limiting example, to barrel B7 of extruder 4. Alternatively, the isocyanate and carbon black may be fed, for example, to hopper 8 feeding into barrel B1, and the isocyanate and carbon black mixed together in the extruder before the polyol is added.

Polyol is mixed with water (foaming agent), for example in Lightning mixer 10, and fed to extruder 4 at location 12, between barrels B7 and B8. The polyol and isocyanate are mixed in the extruder and catalyst is fed from reservoir 14 to barrel B9 and mixed therewith. The catalyzed mixture is fed through the discharge end of the extruder onto a belt conveyor. The discharge end 16 of the extruder suitably has an inclined discharge piece 18 or a flat discharge piece (FIG. 4), for directing the foam downward onto the conveyor.

The temperature in the extruder may be controlled by cooling the barrels, as known in the art. Barrels B7 through B9 (at least) are cooled, generally by water cooling, to facilitate mixing of the components of the reaction mixture without firming.

Conveyor apparatus 11 includes optionally paper-lined conveyor 20 onto which the foam is discharged from end 16 of extruder 2. Appropriate location of the lining paper rolls (not shown) is apparent to one skilled in the art. The foam, optionally between upper and lower paper liners, passes between a pair of rolls 23 which rotate in opposite directions and then onto a slat conveyor 24, 26 through a heated area 28 in which the foam rises. Conveyor 11 may be about 60 ft. in length and is heated to about 150° F. This portion of the conveyor is substantially closed in by enclosure 28 to conserve heat. Doors (not shown) are placed about every 10 ft. along the enclosure to allow access to the equipment. The mixture foams as it passes at about 30 to 80 ft./min. along the conveyor. The foam passes onto a roller conveyor 30 about 30 to 80 ft. in length, substantially at room temperature, for curing before being cut into panels for use. A typical conveyor of this type is shown in Gluck, U.S. Pat. No. 4,795,763, discussed above.

Figure 2:
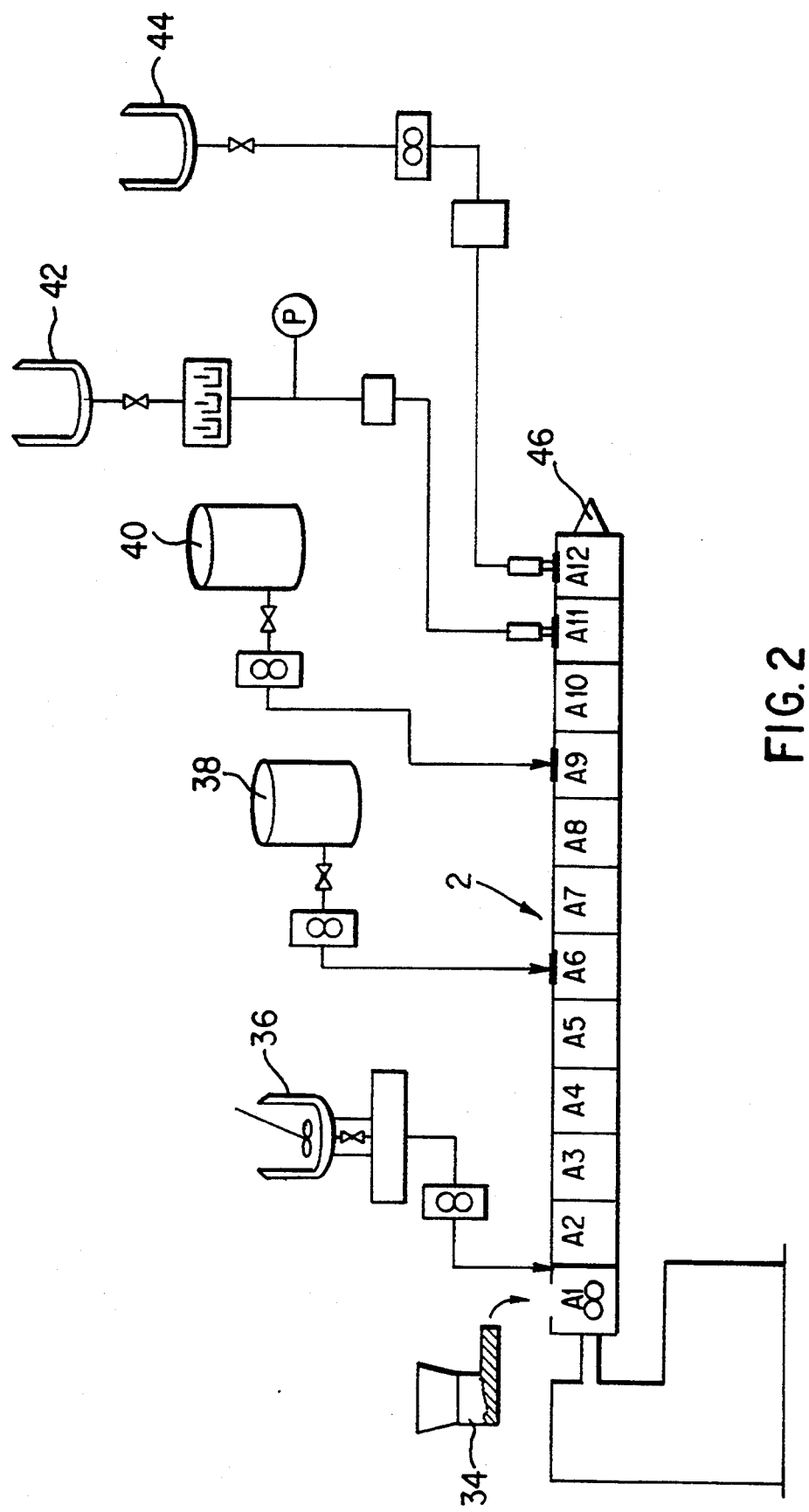
FIG. 2 is a schematic illustration of an extruder for an integrated process including preparation of a polymer premix before extruding polymer foam.

In another example, shown in FIG. 2, using a 12-barrel extruder 32, similar to the 9-barrel extruder illustrated in FIG. 1, carbon black is fed to barrel A1 from hopper 34, a polyol premix of polyol and surfactant is fed from mixer 36 between barrels A1 and A2 and mixed together with the carbon black in the extruder screw. The remainder of the polyol is added from reservoir 38 to barrel A6 and mixed with the carbon black and polyol premix. Isocyanate is fed from reservoir 40 to barrel A9 and mixed with the ingredients already in the screw of the extruder. In this example, hydrochlorofluorocarbon blowing agent (HCFC-141b) is used, and is added from reservoir 42 to barrel A11. Catalyst, such as potassium octoate, is added from reservoir 44 to barrel A12 of the extruder, and mixed into the reaction mix immediately before extrusion. The mixture may be extruded from die 46 onto a conveyor, as illustrated in FIG. 1.

It is well known in the art of thermosetting foams that, in the process of making polyisocyanurate or polyurethane foams, when the mixture is prepared, there is an exothermic reaction of foaming. The speed of this reaction is controllable according to the temperature at which the reaction takes place. The foaming in such a reaction is described as having a "cream time", during which foaming is initiated and the material reaches a consistency of a soft creamy foam, and a "firm time" at which the foam sets up and hardens. In a typical non-limiting example, the cream time may be 7 to 12 seconds and the firm time may be 35 to 60 seconds. The properties of the product may be changed by adjusting the concentrations, temperatures of the barrels, etc.

In prior attempts to extrude thermosetting resins of this type, extrusion has not been successful because the reaction mechanism has not been controlled within the extruder and the mixture has creamed and/or foamed within the extruder, blocking the extruder and preventing extrusion from taking place.

Figure 4:
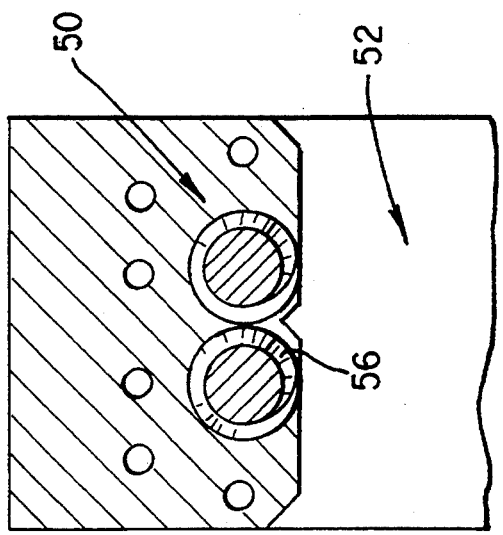
FIG. 4 is a front elevational view of the die of FIG. 3.

A typical extruder die which is useful in avoiding excessive build-up of foam on the die is shown in FIGS. 4 and 5. Discharge plate 50 of extruder 52 is attached to barrel 54. Screw 56 has a flat tip 58 and discharged material 60 falls directly between rolls 62, 64 carrying lining paper 66, 68 for the conveyor (as shown in FIG. 1) on which the isocyanurate polymer is foamed.

In making insulation board, the extrusion process described herein allows fast, economical production. The thermal conductivity of insulation board is reduced by adding carbon black and this advantageously permits reduction of board thickness. The thermal conductivity of polyisocyanurate foams, based on different foaming agents, in BTU per cu.ft., per hr., per °F., are as follows:

| | |
|---|---|
| isocyanurate/HCFC | 0.12 |
| isocyanurate/carbon black/HCFC | 0.09–0.1 |
| isocyanurate/water | 0.14–0.19 |
| isocyanurate/carbon black/water | 0.135–0.17 |
| isocyanurate/carbon black/HCFC/water | 0.09–0.135 |

Use of HCFC (hydrochlorofluorocarbon) foaming agent advantageously reduces the thermal conductivity of the foam. The presence of carbon black also advantageously reduces the thermal conductivity and this compensates for the increase of thermal conductivity if water is used as a foaming agent. The formulation may also include inorganic flame retardants. Incorporation of inorganic flame retardants increases the viscosity of isocyanurate and polyol components. Use of a screw extruder allows thorough mixing of higher viscosity components and the mix is discharged from the extruder prior to the start of the firming reaction.

A carbon black dispersion may be made in the extruder using carbon black, dispersant, optional surfactant and isocyanate or polyol. This dispersion may be used immediately or stored for future use. Use of an extruder provides a better quality dispersion, measuring 8 or more on the Hegman scale, than a dispersion made in a Kady mill.

EXAMPLES 1 to 33

Carbon black dispersion made in the extruder screw

Table 1 shows the composition used for each formulation and Table 2 shows the composition of each polyol premix, used as indicated in Table 1. Pelron P-344 dispersant and Cabot Black Pearls 280 carbon black were used in all the examples. The catalyst was a 3:1 blend, by weight, of potassium octoate and DMP-30. A catalyst blend of 3:1 to 6:1 may be used. The average equivalent weight of BASF 226 prepolymer (polymer/isocyanate mix) and ICI high viscosity isocyanate is about 152.

The operating run schedule is shown in Table 3 and operating parameters of the extruder are shown in Table 4. The torque developed was higher for the carbon black dispersions when compared with the white controls, but was still very low relative to the capabilities of the extruder, and is not a limiting factor. Exit temperatures of the foam mix are shown to be a function of the level of carbon black and the original viscosity of the dispersion medium. The preferred exit temperature is about 25° to 32° C.

Table 5 shows properties of selected test foams.

TABLE 1

| Formulation | Component | Parts by Weight | % | Index | % Trimer |
|---|---|---|---|---|---|
| I | Premix 1 | 40.6 | 11.8 | 2.74 | 12.4 |
| | 2852E Polyol | 59.4 | 17.2 | | |
| | MR-200 Isocyanate | 192.0 | 55.7 | | |
| | Catalyst | 7.5 | 2.2 | | |
| | HCFC-141b | 45.0 | 13.1 | | |
| II | Premix 11 | 40.6 | 11.2 | 2.93 | 12.8 |
| | Carbon Black (C/B) | 17.4 | 4.8 | | |
| | 2852E Polyol | 59.4 | 16.4 | | |
| | MR-200 Isocyanate | 192.0 | 53.0 | | |
| | catalyst | 7.5 | 2.1 | | |
| | HCFC-141b | 45.0 | 12.4 | | |
| III | Premix III | 63.5 | 17.0 | 3.00 | 12.9 |
| | Carbon Black (C/B) | 27.2 | 7.3 | | |
| | 2852E Polyol | 36.5 | 9.8 | | |
| | MR-200 Isocyanate | 192.0 | 51.5 | | |
| | catalyst | 7.5 | 2.0 | | |
| | HCFC-141b | 46.3 | 12.4 | | |
| IV | Premix IV | 40.6 | 11.5 | 2.97 | 12.7 |
| | Carbon Black (C/B) | 17.4 | 4.9 | | |
| | 2SS23 Polyol | 50.0 | 14.2 | | |
| | Isocyanate (ICI, or BASY 226 Prepolymer) | 192.0 | 54.5 | | |
| | Catalyst | 7.5 | 2.1 | | |
| | HCFC-141b | 45.0 | 12.8 | | |

TABLE 2

| Polyol Premix | I pbw | I % | II pbw | II % | III pbw | III % | IV pbw | IV % |
|---|---|---|---|---|---|---|---|---|
| 2852E Polyol | 37.1 | 91.4 | 33.9 | 83.5 | 55.0 | 86.6 | 33.9 | 83.5 |
| Y10222 Surfactant | 3.5 | 8.6 | 3.5 | 8.6 | 3.5 | 5.5 | 3.5 | 8.6 |
| P-344 Dispersant | — | — | 3.2 | 7.9 | 5.0 | 7.9 | 3.2 | 7.9 |

TABLE 3
RUN SCHEDULE

| Run No. | Formulation | Foam Type | Key Variable |
|---|---|---|---|
| 1 | I | White Control | Density Check 1.65 |
| 2 | I | White Control | Lower 141b 1.67 |
| 3 | I | White Control | Higher 141b 1.51 |
| 4 | II | Black Control | Hegman 7 |
| 5 | II | Black Control | Lower 141b |
| 6 | II | Black Control | ISO Adjustment |
| 7 | II | Black Control | Mix/Rate Study @ 600 RPM |
| 8 | II | Black Control | Mix/Rate Study @ 500 RPM |
| 9 | II | Black Control | Mix/Rate Study @ 600 RPM |
| 10 | III | Black Control | Mix/Rate Study @ 600 RPM |
| 11 | III | Black Control | Mix/Rate Study @ 500 RPM |
| 12 | III | Black Control | Mix/Rate Study @ 500 RPM |
| 13, 13A | IV | Black, Prepol. | Mix @ 500 RPM, 13A Higher ISO |
| 14 | IV | Black, Prepol. | Mix @ 600 RPM |
| 15 | IV | Black, Prepol. | Mix/Rate Study @ 600 RPM |
| 16 | IV | Black, Prepol. | Mix/Rate Study @ 500 RPM |
| 17 | IV | Black, Prepol. | Mix/Rate Study @ 500 RPM |
| 18 | IV | Black, ICI | Mix @ 500 RPM |
| 19 | IV | Black, ICI | Mix @ 600 RPM |
| 20 | IV | Black, ICI | Catalyst Adjustment |
| 21 | IV | Slack, ICI | 141b Adjustment |
| 22 | IV | Black, ICI | 141b Adjustment |
| 23 | IV | White, Prepol. | Control |
| 24 | IV | Black, Prepol. | Prepol + C/B |
| 25 | IV | Black, Prepol. | Higher C/B @ 500 RPM |
| 26 | IV | Slack, Prepol. | Higher C/B @ 600 RPM |
| 27 | IV | Black, Prepol. | Low Rate, Low on Matl. |
| 28 | IV | White Control | ICI High Visc. ISO |
| 29 | IV | Black Control | Std. % C/B |
| 30 | IV | Black Control | Higher C/B |
| 31 | IV | Black Control | Higher C/B |
| 32 | IV | Black Control | Higher C/B |

TABLE 3-continued

RUN SCHEDULE

| Run No. | Formulation | Foam Type | Key Variable |
|---|---|---|---|
| 33 | IV | White Control | R-22 Froth |

TABLE 4

OPERATING PARAMETERS

| Run No. | RPM | % Torque | lbs/hr | Exit Temp. °C. | % C/B | Foam Quality |
|---|---|---|---|---|---|---|
| 1 | 500 | 5.1 | 300 | 28 | 0 | Good |
| 2 | 500 | 5 | 300 | 27 | 0 | Good |
| 3 | 500 | 4.9 | 300 | 28 | 0 | Good |
| 4 | 500 | 16 | 300 | 27 | 4.8 | Good |
| 5 | 500 | 15.9 | 300 | 28 | 4.8 | Good |
| 6 | 500 | 15.8 | 300 | 28 | 4.8 | Good |
| 7 | 600 | 15.2 | 300 | 29 | 4.8 | Good |
| 8 | 500 | 17.7 | 400 | 29 | 4.8 | Good |
| 9 | 600 | 16.4 | 400 | 29 | 4.8 | Good |
| 10 | 600 | 16.7 | 450 | 29 | 7.3 | Good |
| 11 | 500 | 22 | 450 | 29 | 7.3 | Good |
| 12 | 500 | 24 | 400 | 29 | 7.3 | Good |
| 13 | 500 | 14.3 | 300 | 30, 31 | 4.8 | Good, Sl. Soft |
| 14 | 600 | 13.7 | 300 | 33 | 4.8 | Fair |
| 15 | 600 | 16.1 | 450 | 35 | 4.8 | Fair |
| 16 | 500 | 16.8 | 450 | 34 | 4.8 | Fair |
| 17 | 500 | 21.0 | 600 | 32 | 4.8 | Fair |
| 18 | 500 | 20.6 | 300 | 31 | 4.8 | V. Good |
| 19 | 600 | 19.8 | 300 | 32 | 4.8 | V. Good |
| 20 | 600 | 18.0 | 300 | 32 | 4.8 | V. Good |
| 21 | 600 | 17.6 | 300 | 33 | 4.8 | V. Good |
| 22 | 600 | 17.4 | 300 | 32 | 4.8 | V. Good |
| 23 | 500 | 7.0 | 300 | 7 | 4.8 | V. Good |
| 24 | 500 | 14.0 | 300 | 14 | 4.7 | V. Good |
| 25 | 500 | 27.0 | 300 | 27 | 7 | V. Good |
| 26 | 600 | 24.8 | 300 | 25 | 7 | V. Good |
| 27 | 600 | 24.0 | 190 | 24 | 7 | V. Good |
| 28 | 500 | 6.4 | 300 | 34 | 0 | V. Good |
| 29 | 600 | 13.5 | 300 | 37 | 4.7 | V. Good |
| 30 | 600 | 14.7 | 450 | 34 | 7 | V. Good |
| 31 | 600 | 29.0 | 300 | 39 | 7 | V. Good |
| 32 | 600 | 27.6 | 300 | 40 | 7 | Good |
| 33 | 600 | 26 | 300 | 33 | 0 | V. Good |

TABLE 5

| Run No. | k-Init. | k-Aged | % Closed Cell | % Friability | Density |
|---|---|---|---|---|---|
| 1 | .136 | — | — | — | 1.62 |
| 2 | .140 | — | — | — | 1.69 |
| 4 | — | .167 | 79 | 29 | |
| 7 | .128 | — | — | — | |
| 9 | .124 | — | — | — | |
| 10 | .131 | — | — | — | |
| 12 | .134 | — | — | — | |
| 13 | | .141 | 81 | 8 | |
| 13A | — | .136 | 81 | 13 | |
| 14 | .123 | — | — | — | |
| 15 | .121 | .145 | 86 | 12 | |
| 16 | — | .138 | 85 | 13 | |
| 17 | — | .148 | 87 | 35 | |
| 18 | — | .155 | 82 | 18 | |
| 19 | .123 | .146 | — | — | |
| 20 | — | .146 | 86 | 20 | |
| 21 | .128 | — | — | — | |
| 22 | .139 | — | — | — | |
| 23 | .132 | .139 | 84 | 8 | |
| 28 | — | .149 | 90 | 20 | |
| 29 | .132 | — | — | — | |
| 33 | — | .177 | 81 | 12 | |

EXAMPLE 34

Carbon black dispersion made outside the extruder screw

| Component A: | polymeric methyldiisocyanate (MDI) | 91% |
| | carbon black | 9% |
| | viscosity: 20,000 cps; | |
| | dispersion quality: Hegman bar - 50 microns | |
| Component B: | polyol | 91% |
| | silicone surfactant | 5% |
| | water | 4% |
| Component C: | preblended catalyst (potassium octoate) | 2% |

Components A, B and C were mixed in the percentage ratio A:B:C of 74:24:2, by weight.

Using apparatus of FIG. 1, the process was started by injecting component A into barrel B7 until it was observed exiting the extruder. Component B was then injected to the spacer between barrels B7 and B8, followed by injection of catalyst to barrel B9. Shutdown was performed in reverse order. The machine was purged with methylene chloride.

The product had a compression strength of 26 psi, a density of 2.3 lb./cu. ft. and a K factor (thermal conductivity) of 0.168 BTU/sq. ft./° F.

When the machine was taken apart, it was easy to remove the barrels separated by Graphoil paper. The internal surfaces of the barrel in the process section were coated with a thin hard layer of cured material but this was readily removable.

Substantially higher concentration of isocyanate (component A) leads to hard and brittle foam. Substantially higher concentration of polyol (component B) leads to rubbery, soft foam and increased exotherm of reaction.

As the speed of the machine is increased, the cell size of the foam is decreased. Variation of these parameters to provide foam having certain characteristics will be apparent to one skilled in the art. The apparatus can be run satisfactorily at speeds of, for example, 500–600 RPM to produce an output of, for example, 450–600 lb./hr.

EXAMPLE 35

Carbon black dispersion made in the extruder screw

| Component A: | polymeric methyldiisocyanate (MDI) | 100.00 parts |
| | carbon black | 9.29 parts |
| | dispersant | 1.93 parts |
| | surfactant | 1.7 parts |

Using apparatus of FIG. 1, the process was started by injecting the ingredients for component A into barrel B7 until it was observed exiting the extruder. The dispersion produced was of better quality than that produced in a Kady mill and registered more than 8 on the Hegman scale.

In a further embodiment of the invention, polyisocyanurate bunstock may be made using an extruder. The bun is cut from an extrudate which is passed from the die of the extruder to a conveyor belt having release-coated paper liners on the top, bottom and sides. A kraft paper liner having a polymer coating is suitable for use as a release paper. A 20 ft. conveyor may be used, moving at about 9 to 10 ft./min. The bunstock may be from 4 in. to 2 ft. or more in thickness. The foam is warm as it exits the extruder and is allowed to cure for 4 to 6 days. In a typical example of making bunstock on an extruder, the following formulation was used:

EXAMPLE 36

Bunstock made in the Extruder

| Material | ppm |
| --- | --- |
| Isocyanate (Miles - Mondur MR) | 101 |
| Polymer resin (Iso-Shield - P101) | 78 |
| R-11 (Atochem - Isotron 11) | 13.81 |
| Catalyst #1 (Air Products - TMR-3) | 1.17 |
| Catalyst #2a (Air Products - DMEA) | .312 |
| Catalyst #2b (Ashland - DEG) | .312 |

Figure 3:
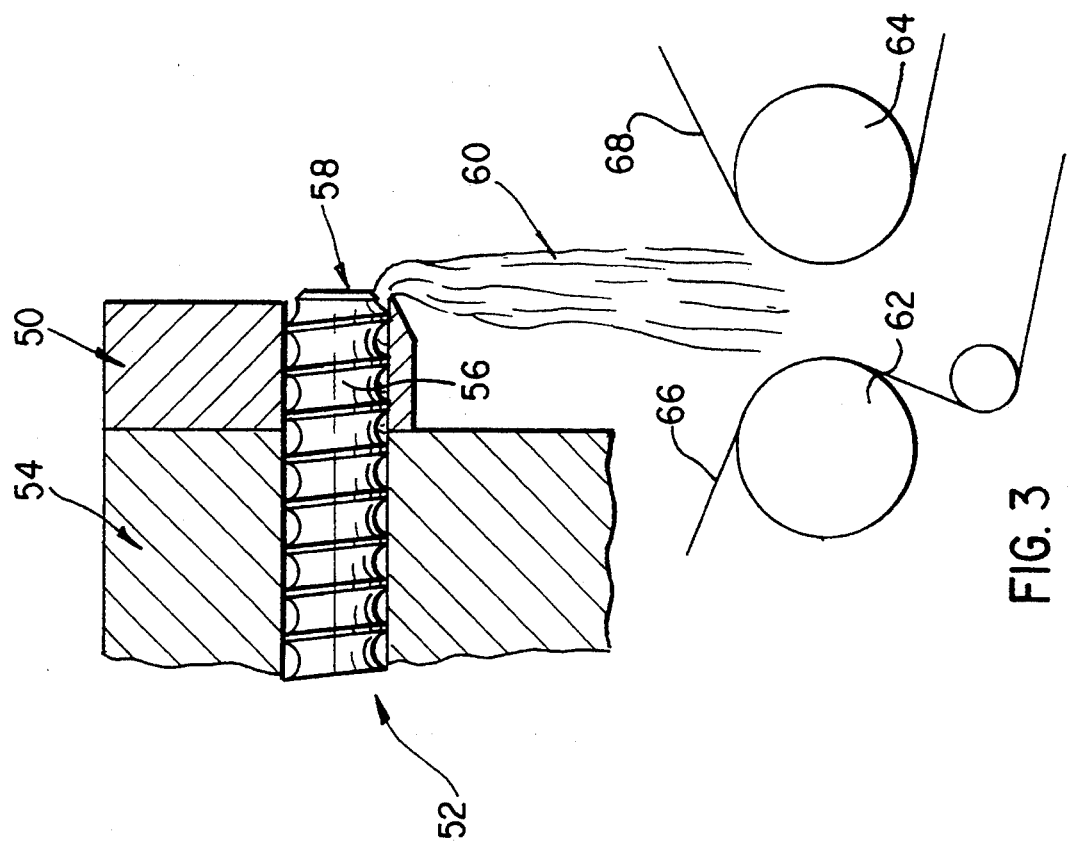
FIG. 3 is a cross-sectional view of a typical extruder die.

The foam was extruded from a die of an extruder, having a large cross-section, as shown in FIGS. 3 and 4, onto a conveyor lined with paper on the top, bottom and sides, to form bunstock having dimensions of about 27" high × 51½" wide. The cream time was 28 sec., the gel time was 2 min. 34 sec., the rise time was 3 min. 55 sec. and the tack free time was 4 min. 31 sec. The conveyor speed was about 9 to 10 ft./min. Bunstock may be extruded at a speed of about 200 lb./min. A typical bun may be about 27" × 51½" × 10 ft. in size and may be cut to smaller blocks, as required. Different levels of carbon black may be used, providing different K-values.

The extruder may alternatively be used to make the carbon black dispersion only, which is then fed to a tank for storage and later use.

When the extruder may be used for making both the dispersion and the foam, the cream time and gel time are relatively slow due to the size of the bunstock. The bunstock which is liquid at extrusion onto the conveyor, is firm after reaching the end of the conveyor and being released from the paper liners. The process described allows for large volume bunstock to be made, of very high quality.

While the invention has been described with reference to certain embodiments thereof, it will be appreciated that variations and modifications may be made without departing from the spirit and scope of the invention.

What is claimed is:

1. A method for preparing a thermosetting polymer foam comprising:
   introducing polyol to the screw of an extruder;
   introducing isocyanate to the screw of the extruder;
   mixing the polyol and the isocyanate in the screw of the extruder;
   introducing foaming agent to the screw of the extruder;
   introducing catalyst to the screw of an extruder at a position adjacent an extruding die of the extruder;
   mixing the catalyst with the foaming agent and an already formed mixture of polyol and isocyanate in the extruder, thereby reacting the isocyanate and polyol and initiating a foaming reaction in the extruder immediately before extrusion; and
   extruding a blended mixture so formed onto a conveyor and foaming the blended mixture to produce thermosetting polymer foam, whereby expansion of the mixture into foam takes place outside the extruder.

2. A method according to claim 1 comprising mixing finely divided carbon black with the isocyanate before introducing the isocyanate mixture so formed to the screw of the extruder.

3. A method according to claim 1 comprising mixing surfactant with the polyol before introducing the polyol mixture so formed to the screw of the extruder.

4. A method according to claim 3 further comprising mixing dispersant with the polyol and surfactant before introducing the polyol mixture so formed to the screw of the extruder.

5. A method according to claim 1 wherein the foaming agent comprises hydrochlorofluorocarbon foaming agent.

6. A method according to claim 1 wherein the foaming agent comprises water.

7. A method according to claim 6 comprising vaporizing the water for foaming the mixture.

8. A method according to claim 7 wherein the water reacts with the isocyanate to form carbon dioxide.

9. A method for preparing a thermosetting polymer foam comprising:
   introducing polyol to a screw of an extruder;
   introducing isocyanate to the screw of the extruder;
   mixing the polyol and the isocyanate in the screw of the extruder;
   introducing catalyst to the screw of the extruder;
   mixing the catalyst with the isocyanate and the polyol in the extruder;
   extruding the mixture onto a conveyor; and
   foaming the mixture to produce polymer foam;
   wherein said method comprises adding polyol at a first position of the extruder, adding isocyanate at a second position of the extruder, downstream of the first position, adding foaming agent to the extruder at a third position, downstream of the second position, adding catalyst to the mixed polyol, isocyanate and foaming agent at a fourth position of the extruder close to the extrusion die, and extruding the catalyzed mixture for foaming.

10. A method according to claim 9 further comprising adding carbon black to the extruder upstream of said first position.

11. A method according to claim 10 comprising adding a portion of the polyol as a polyol premix at a position of the extruder between the positions at which the carbon black and polyol are added.

12. A method according to claim 11 wherein the polyol premix comprises at least one member selected from the group consisting of surfactant and dispersant.

13. A method according to claim 9 further comprising cooling the catalyzed mixture before extruding.

14. A method according to claim 9 comprising decreasing foam cell size by increasing extruder speed.

15. A method for preparing a thermosetting polymer foam comprising:
   introducing polyol to a first position in a screw of an extruder;
   introducing isocyanate to a second position in the screw of an extruder;
   blending the isocyanate and the polyol in the screw of the extruder;
   introducing foaming agent to the screw of the extruder;
   introducing catalyst to the screw of the extruder at a position adjacent an extruding die of the extruder;
   mixing the catalyst with the foaming agent and an already formed mixture of polyol and isocyanate in the extruder, thereby initiating a foaming reaction in the extruder immediately before immediately extruding a blended mixture so formed onto a conveyor and foaming the blended mixture to produce thermosetting polymer foam.

16. A method according to claim 15 wherein the thermosetting polymer foam is selected from the group consisting of polyisocyanurate foams and polyurethane foams.

17. A method according to claim 15 further comprising adding surfactant to the polyol before introducing the polyol to the extruder.

18. A method according to claim 15 further comprising forming a polyol premix of a first portion of the polyol and at least one member selected from the group consisting of surfactant and dispersant and adding said polyol premix to the extruder before adding a second portion of polyol to the screw of the extruder.

19. A method according to claim 18 further comprising adding carbon black to the extruder before adding the polyol premix and mixing the carbon black and the polyol premix in the screw of the extruder.

20. A method according to claim 18 further comprising adding carbon black to the extruder before adding the isocyanate and mixing the carbon black and the isocyanate in the screw of the extruder.

* * * * *